United States Patent [19]

Severson et al.

[11] Patent Number: 5,042,113
[45] Date of Patent: Aug. 27, 1991

[54] ELASTIC CONNECTOR

[76] Inventors: Sandra S. Severson; Larry E. Severson, both of 720 Second St. NW., Waseca, Minn. 56093

[21] Appl. No.: 591,709

[22] Filed: Oct. 2, 1990

[51] Int. Cl.⁵ ............................................. B65D 63/00
[52] U.S. Cl. .............................. 24/16 PB; 24/30.5 P; 24/300
[58] Field of Search ............... 24/16 PB, 17 A, 17 B, 24/17 AP, 300, 16 R, 3 R, 3 M

[56] References Cited

U.S. PATENT DOCUMENTS

| 654,668 | 7/1900 | Pergande | 24/17 A |
| 3,561,074 | 2/1971 | Mosher et al. | 24/17 B |
| 4,983,047 | 1/1991 | Netto | 24/30.5 R |

Primary Examiner—Victor N. Sakran
Attorney, Agent, or Firm—Merchant, Gould, Smith, Edell, Welter & Schmidt

[57] ABSTRACT

A connector for electrical cords which includes (i) a longitudinal length of material having first and second longitudinal ends, (i) a first pair of laterally extending appendages extending as lateral mirror-images from the first longitudinal end of the longitudinal length of material with [—] a first of the appendages having a pair of male snap halves spaced along the length of the appendage, and [—] a second of the appendages having a male snap half and a female snap half spaced along the length of the appendage, (c) a second pair of laterally extending appendages extending as lateral mirror-images from the second longitudinal end of the longitudinal length of material with [—] a first of the appendages substantially diametrically opposed to the second of the appendages in the first appendage pair and having a pair of female snap halves spaced along the length of the appendage, and [—] a second of the appendages substantially diametrically opposed to the first of the appendages in the first appendage pair and having a male snap half and a female snap half spaced along the length of the second appendage.

7 Claims, 2 Drawing Sheets

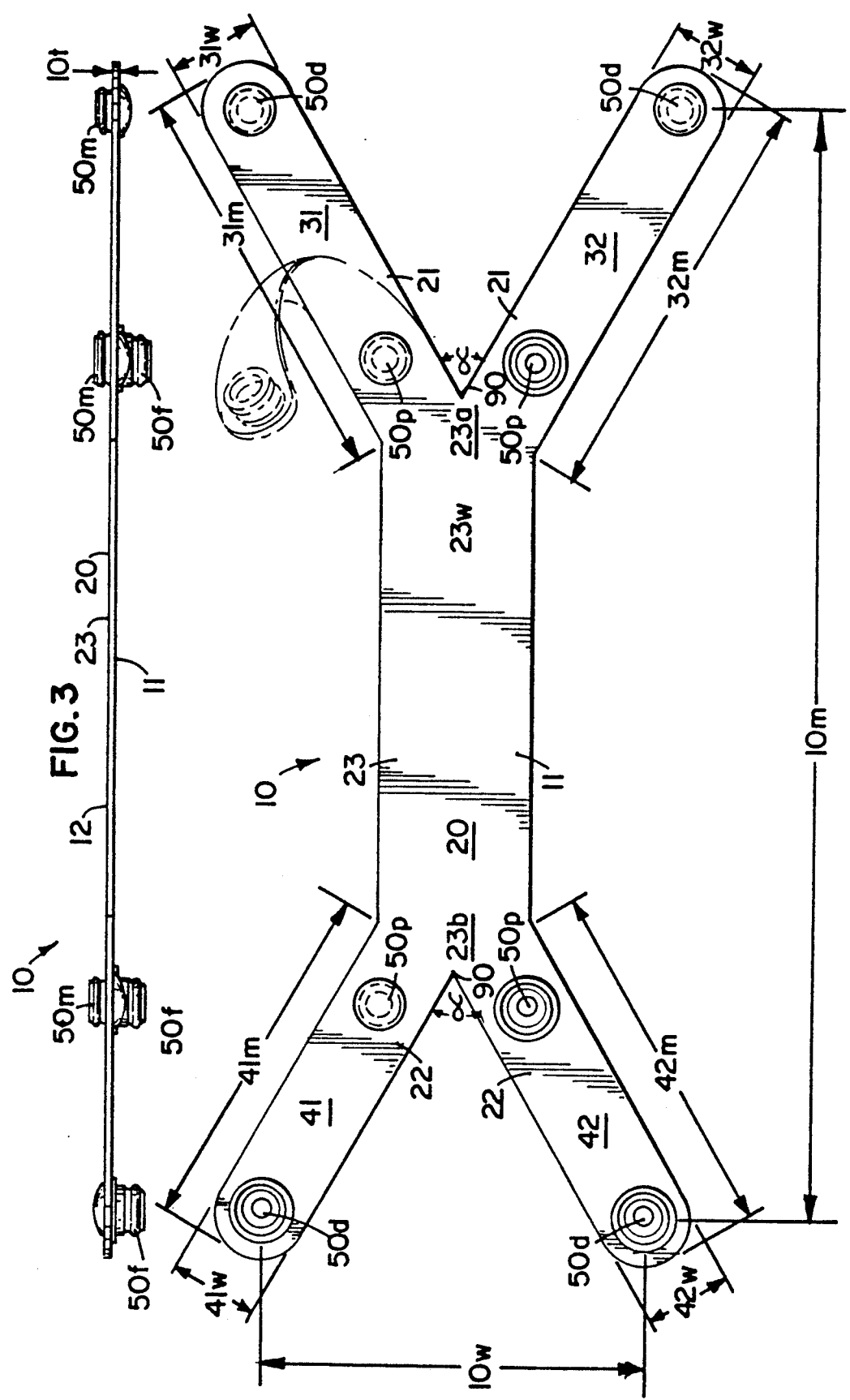

ELASTIC CONNECTOR

FIELD OF THE INVENTION

The invention relates to devices for connecting separate components to form a unitary assembly and/or securing unruly items in an orderly fashion.

BACKGROUND

It is a well recognized principle that the handling, transportation and storage of multiple components can be significantly simplified by physically combining the individual components into a composite unit. Implementation of this general principle is embodied in such common everyday products as cardboard boxes, plastic trash bags, paper grocery sacks, egg cartons, brief cases, luggage, shopping carts, etc.

Similar to this first principle is the related principle that the handling, transportation, storage and use of unruly items such as electrical cords, battery cables, garden hoses, landscaping trim, etc. can be significantly simplified by securing the item in an orderly fashion. Implementation of this general principle is embodied in such common everyday products as twist-ties, ratchet-ties, rubber bands, garden hose reels, electrical cord reels, etc.

Many different apparatuses and systems, based upon these simple principles, have been created and used to solve a wide variety of problems associated with the storage, shipping, handling and use of multiple and/or unruly items. However, the search continues for new and improved apparatuses and systems capable of simplifying the storing, shipping, and handling of various items.

BRIEF DESCRIPTION OF THE DRAWINGS

FIG. 2 is a top view of the invention embodiment depicted in FIG. 1.

FIG. 3 is a side view of the invention embodiment depicted in FIG. 1.

SUMMARY OF THE INVENTION

Figure 1:
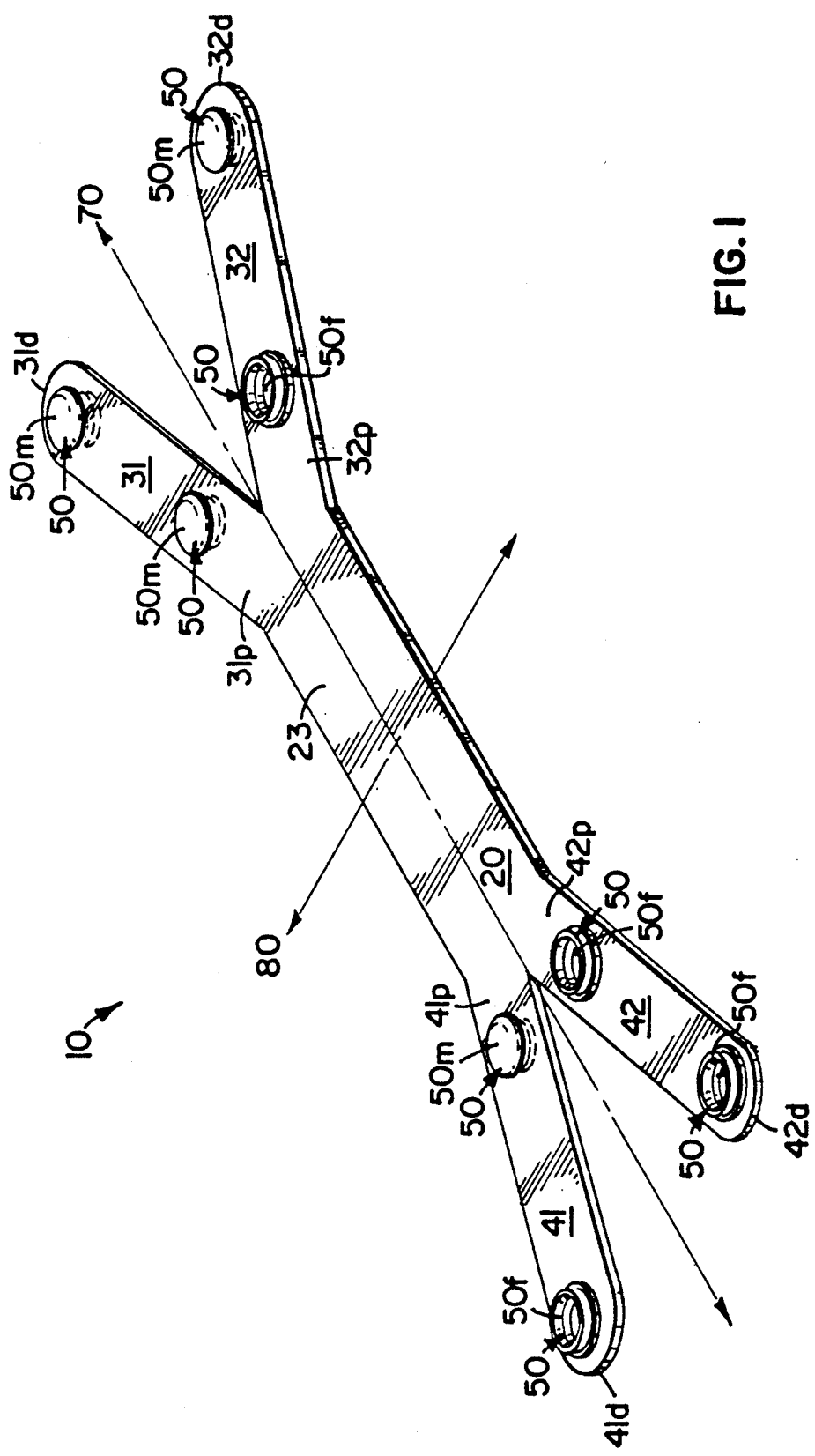
FIG. 1 is a perspective view of one embodiment of the invention.

A connector suitable for bundling electrical cords and securing electrical connections which includes (1) a longitudinal length of material having first and second longitudinal ends, (2) a first pair of laterally extending appendages which extend from the first longitudinal end of the longitudinal length of material as mirror-images with respect to the longitudinal axis of the longitudinal length of material (lateral mirror-images) wherein the first of the appendages has a pair of male snap halves spaced along the length of the appendage and the second of the appendages has a male snap half and a female snap half spaced along the length of the appendage, (3) a second pair of laterally extending appendages which extend from the second longitudinal end of the longitudinal length of material as mirror-images with respect to the longitudinal axis of the longitudinal length of material (lateral mirror images) wherein the first of the appendages has a pair of female snap halves spaced along the length of the appendage and the second of the appendages has a male snap half and a female snap half spaced along the length of the appendage. The first pair of appendages are configured and arranged with respect to the second pair of appendages such that the first appendage of the first pair and the first appendage of the second pair are substantially diametrically opposed while the second appendage of the first pair and the second appendage of the second pair are substantially diametrically opposed.

DETAILED DESCRIPTION OF THE INVENTION INCLUDING A BEST MODE

The connector is designed to retain a bundled length of electrical cord and secure an electrical connection.

Nomenclature

| | |
|---|---|
| 10 | connector |
| 10m | length of connector |
| 10w | width of connector |
| 10t | thickness of connector |
| 11 | upper surface of connector |
| 12 | lower surface of connector |
| 20 | elastic body |
| 21 | first pair of appendages |
| 22 | second pair of appendages |
| 23 | central portion |
| 23a | first longitudinal end of central portion |
| 23b | second longitudinal end of central portion |
| 23w | width of central portion |
| 31 | first appendage of first pair |
| 31p | proximal end of first appendage of first pair |
| 31d | distal end of first appendage of first pair |
| 31m | length of first appendage of first pair |
| 31w | width of first appendage of first pair |
| 32 | second appendage of first pair |
| 32p | proximal end of second appendage of first pair |
| 32d | distal end of second appendage of first pair |
| 32m | length of second appendage of first pair |
| 32w | width of second appendage of first pair |
| 41 | first appendage of second pair |
| 41p | proximal end of first appendage of second pair |
| 41d | distal end of first appendage of second pair |
| 41m | length of first appendage of second pair |
| 41w | width of first appendage of second pair |
| 42 | second appendage of second pair |
| 42p | proximal end of second appendage of second pair |
| 42d | distal end of second appendage of second pair |
| 42m | length of second appendage of second pair |
| 42w | width of second appendage of second pair |
| 50 | snap half |
| 50m | male snap half |
| 50f | female snap half |
| 50p | proximal snap half |
| 50d | distal snap half |
| 70 | longitudinal central axis |
| 80 | lateral central axis |
| 90 | appendage separation point |
| α | angle formed between paired appendages |

As utilized herein, including the claims, the term "planar circumference", when used to describe the loops formed from the connector, means the circumference of the circle created by longitudinally projecting the loop onto a plane perpendicular to the longitudinal axis of the loop.

Planar circumference is an important dimension for assessing functionality of the connector 10, even though loops (not shown) formed from the connector 10 are substantially in the shape of a frustrom, as the connector 10 generally retains items parallel to the longitudinal axis of the loop (not shown).

As utilized herein, including the claims, the "proximal end" of the appendages is defined by a line extending across the width of the appendage and passing through the point at which the appendages begin to separate 90.

The connector 10 is a continuous elastic body 20 with male snap halves 50m and female snap halves 50f strategically located along the elastic body 20.

The elastic body 20 includes (—) a central longitudinal portion 23, (—) a first pair of appendages 21 independently extending from a first longitudinal end 23a of the central longitudinal portion 23 at an angle α of about 0° to 180°, preferably about 20° to 90°, with respect to one another, and (—) a second pair of appendages 22 independently extending from a second longitudinal end 23b of the central longitudinal portion 23 at an angle α of about 0° to 180°, preferably about 20° to 90°, with respect to one another.

The elastic body 20 may be constructed from any suitably elastic material possessing sufficient structural integrity. The environmentally preferred material of construction for the elastic body 20 is recyclable rubber such as discarded inner tubes.

The connector 10 is symmetrical about both the longitudinal axis 70 and lateral axis 80. Symmetry about the longitudinal axis 70 is achieved because (—) the first 31 and second 32 appendages of the first appendage pair 21 extend from the longitudinal axis 70 as lateral mirror-images of one another, and (—) the first 41 and second 42 appendages of the second appendage pair 22 extend from the longitudinal axis 70 as lateral mirror-images of one another. Symmetry about the lateral axis 80 is achieved because the first appendage pair 21 and the second appendage pair 22 extend from the lateral axis 80 as mirror-images of one another (longitudinal mirror-images).

A consequence of this lateral and longitudinal symmetry is that the first appendage 31, 41 of each appendage pair 21, 22 is substantially diametrically opposed to the second appendage 32, 42 of the other appendage pair 21, 22.

The connector length $10m$ is the longitudinal distance between the centers of the distal snap halves $50d$ on longitudinal mirror-image appendages 31 to 41 and 32 to 42. Selection of an appropriate length $10m$ for the connector 10 depends upon the particular intended use of the connector 10. A desired function which must be considered in selection of the connector length $10m$ is that the connector 10 should produce loops (not shown) having a planar circumference which results in slight stretching of the connector 10 when retaining an item(s). Generally the connector 10 should have a length $10m$ of about 6 to 12 inches as a connector length $10m$ of less than about 6 inches is insufficient for many desired uses of the connector 10 while a connector length $10m$ of more than about 12 inches increases the cost and bulkiness of the connector 10 without providing a commensurate advantage.

The central longitudinal portion 23 of the connector 10 should provide about 20% to 60% (generally about 2 to 6 inches) of the connector length $10m$ with the appendages 31, 32, 41, 42 constituting the remaining 40% to 80% (generally about 3 to 6 inches) of the connector length $10m$. A central longitudinal portion 23 which constitutes less than about 20% of the connector length $10m$ generally results in a structurally unsound connector 10 while a central longitudinal portion 23 which constitutes more than about 60% of the connector length $10m$ interferes with connection of diametrically opposed appendages 31 to 42 and 32 to 41.

The connector width $10w$ is the lateral distance between the centers of the distal snap halves $50d$ on paired appendages 21, 22. The connector width $10w$ is defined by a combination of (—) placement of the distal snap halves $50d$ on the appendages, (—) length of the appendages 31, 32, 41, 42, and (—) the angle α between the paired appendages 21, 22.

Appendage length $31m$, $32m$, $41m$, $42m$ is indirectly defined by the connector length $10m$, the percentage of that length $10m$ attributable to the appendages 31, 32, 41, 42 and the angle α between the paired appendages 21, 22.

As discussed previously, the angle α defined by the paired appendages 21, 22 may be between about 0° to 180° with an angle of about 20° to 90° preferred for purposes of (i) facilitating passage of an electrical cord (not shown) between the paired appendages (between 31 and 32 and between 41 and 42) while maximizing the contribution provided by the appendages 31, 32, 41, 42 to the length $10m$ of the connector 10, and (ii) providing a beneficial (uniformly spaced) variation in the planar circumference of the longitudinal loops formed from the elastic body 20 as between a longitudinal loop obtained by connecting snap halves 50 on longitudinal mirror-image appendages (31 to 41 and 32 to 42) and a longitudinal loop obtained by connecting snap halves 50 on diametrically opposed appendages (31 to 42 and 32 to 41).

Selection of an appropriate connector width $10w$ requires a balancing between the competing interests of manageability (increased width=increased bulkiness), and cost (increased width=increased cost) as well as the interests expressed with respect to selection of the angle α between the paired appendages 21, 22. Generally, a connector width $10w$ of about 3 inches to about 6 inches provides an appropriate balancing of these interests.

Selection of an appropriate width $23w$ for the central longitudinal portion 23 and width $31w$, $32w$, $41w$, $42w$ of the appendages 31, 32, 41, 42 requires a balancing between the competing interests of structural integrity (increased width=increased structural integrity), manageability (increased width=increased bulkiness), and cost (increased width=increased cost). In addition, an appendage width $31w$, $32w$, $41w$, $42w$ of less than about 1 inch generally does not provide a sufficiently wide surface area for securement of the snap halves 50 to the appendages 31, 32, 41, 42. Generally, a central portion width $23w$ of about 1 to about 3 inches and an appendage width $31w$, $32w$, $41w$, $42w$ of about 1 to 2 inches provides an appropriate balance between the competing interests.

Selection of an appropriate thickness $10t$ for the connector 10 depends upon the material of construction and requires a balancing between the competing interests of structural integrity (increased thickness=increased structural integrity), manageability (increased thickness=increased bulkiness), stretchability (increased thickness=decreased stretchability), and cost (increased width=increased cost). Generally, when recycled rubber is employed, a connector thickness $10t$ of about 0.05 to 0.1 inches provides an appropriate balance between the competing interests.

The snap halves 50 are spaced along the length of the appendages 31, 32, 41, 42 with one snap half 50 proximate the proximal end $31p$, $32p$, $41p$, $42p$ of the appendages 31, 32, 41, 42 and another snap half 50 proximate the distal end $31d$, $32d$, $41d$, $42d$ of the appendages 31, 32, 41, 42. The snap halves are configured such that the female snap halves $50f$ extend from the upper face 11 of the elastic body 20 while the male snap halves $50m$ extend from the lower face 12 of the elastic body 20. By extending the male snap halves $50m$ and female snap halves 50f in this manner a circular cylinder is formed from the elastic body 20 when the snap halves 50 are connected. Extending the snap halves 50 from the elastic body 20 in the same direction would result in the formation of a tear drop or mobius strip from the elastic body 20 when the male snap halves 50m and female snap halves 50f are connected.

The male snap halves 50m and female snap halves 50f are configured as between the appendages 31, 32, 41, 42 to permit lateral coupling of the paired appendages (31 to 32 and 41 to 42), longitudinal coupling of the longitudinal mirror-image appendages (31 to 41 and 32 to 42) and longitudinal coupling of the diametrically opposed appendages (31 to 42 and 32 to 41). In addition, the placement of the male snap halves 50m and female snap halves 50f with respect to each other as between the proximal ends 31p, 32p, 41p, 42p and the distal ends 31d, 32d, 41d, 42d of the appendages 31, 32, 41, 42 should be designed to maximize (i) the longitudinal dual coupling capabilities of the snap halves 50 and (ii) the single appendage coupling capabilities of the snap halves 50. Longitudinal dual coupling means that a snap half 50 (regardless of proximal or distal position) may be coupled with both a proximal snap half 50p and a distal snap half 50d on a longitudinal mirror-image and/or diametrically opposed appendage 31, 32, 41, 42. Single appendage coupling means that a single appendage 31, 32, 41, 42 includes a male snap half 50m and a female snap half 50f so that the individual appendage 31, 32, 41, 42 may be looped. Maximization of longitudinal dual coupling and single appendage coupling maximizes the number of longitudinal loops having different planar circumferences which can be formed by the connector 10.

The spacing between the snap halves 50 on each appendage 31, 32, 41, 42 affects the planar circumference of the longitudinal loops obtained by connecting a combinations of a proximal snap half 50p and a distal snap half 50d. Generally, a beneficial variation (substantially uniform spacing over a large range) in the planar circumference of the longitudinal loops can be achieved with a spacing of about 1 to 3 inches between the centers of the snap halves 50 on each appendage 31, 32, 41, 42. The other dimensions of the connector 10 including connector length 10m and connector width 10w also affect the variation in the planar circumferences obtainable from a single connector 10. Accordingly, the dimensions of the connector 10 interact and should be selected with an understanding as to the effect upon the variation of the planar circumferences obtainable by the connector 10.

Maximization of loops with different planar circumferences can best be accommodated by arranging the male snap halves 50m and female snap halves 50f as set forth below:

41, and the diametrically opposed appendage is appendage 42.

Lateral looping of the connector 10 is achieved by connecting the proximal male snap half 50p/50m on appendage 31 with the proximal female snap half 50p/50f on appendage 32 and the proximal male snap half 50p/50m on appendage 41 with the proximal female snap half 50p/50f on appendage 42. Connection of these snap halves 50 is best achieved by laterally moving the appendages 31, 32, 41, 42 of each appendage pair 21, 22 in a scissor-like motion with respect to each other until the male snap half 50m and female snap half 50f are transversely aligned. This requires that the laterally opposed proximal snap halves 50p which are to be connected must be spaced a sufficient distance along the appendage 31, 32, 41, 42 to permit overlapping of the snap halves 50 when the appendages 31, 32, 41, 42 are laterally moved in a scissor-like fashion. Generally, positioning of the proximal snap halves 50p at least about 0.5 inches from the proximal end 31p, 32p, 41p, 42p of the appendage 31, 32, 41, 42 provides the necessary lateral flexibility to permit lateral coupling of the proximal snap halves 31p to 32p and 41p to 42p by lateral scissor-like movement of the paired appendages 21, 22.

Longitudinal looping of the connector 10 (from largest diameter to smallest planar circumference) may be achieved by connecting (i) the distal male snap half 50d/50m on appendage 31 with the distal female snap half 50d/50f on appendage 41 and the distal male snap half 50d/50m on appendage 32 with the distal female snap half 50d/50f on appendage 42, (ii) the distal male snap half 50d/50m on appendage 31 with the distal female snap half 50d/50f on appendage 42 and the distal male snap half 50d/50m on appendage 32 with the distal female snap half 50d/50f on appendage 41, (iii) the distal male snap half 50d/50m on appendage 32 with the proximal female snap half 50p/50f on appendage 42 or the distal female snap half 50d/50f on appendage 41 with the proximal male snap half 50p/50m on appendage 31, (iv) the distal male snap half 50d/50m on appendage 31 with the proximal female snap half 50p/50f on appendage 42 or the distal female snap half 50d/50f on appendage 42 with the proximal male snap half 50p/50m on appendage 31, (v) the proximal male snap half 50p/50m on appendage 31 with the proximal female snap half 50p/50f on appendage 42 or the proximal female snap half 50p/50f on appendage 32 with the proximal male snap half 50p/50m on appendage 41, (vi) the distal male snap half 50p/50m on appendage 32 with the proximal female snap half 50p/50f on appendage 32 and/or the distal female snap half 50p/50m on appendage 41 with the proximal male snap half 50p/50f on appendage 41.

| named appendage | | lateral mirror-image appendage | | longitudinal mirror-image appendage | | diametrically opposed appendage | |
|---|---|---|---|---|---|---|---|
| p | d | p | d | p | d | p | d |
| male | male | female | male | male | female | female | female | p = proximal
d = distal p = proximal
d = distal

The configuration established above is depicted in FIGS. 1-3 where the named appendage is appendage 31, the lateral mirror-image appendage is appendage 32, the longitudinal mirror-image appendage is appendage

EXAMPLES

A connector such as depicted in FIGS. 1-3 with the dimensions set forth below in Table A would provide loops having the planar circumferences set forth in Table B.

TABLE A

Connector Dimensions (inches)

| Appendage | Appendage 31 | | Appendage 32 | | Appendage 41 | | Appendage 42 | |
|---|---|---|---|---|---|---|---|---|
| | pm | dm | pf | dm | pm | df | pf | df |
| 31 | | | | | | | | |
| pm | — | 3.0 | 2.0 | — | 4.0 | — | — | — |
| dm | 3.0 | — | — | 5.0 | — | 9.6 | — | — |
| 32 | | | | | | | | |
| pf | 2.0 | — | — | 3.0 | — | — | 4.0 | — |
| dm | — | 5.0 | 3.0 | — | — | — | — | 9.6 |
| 41 | | | | | | | | |
| pm | 4.0 | — | — | — | — | 3.0 | 2.0 | — |
| df | — | 9.6 | — | — | 3.0 | — | — | 5.0 |
| 42 | | | | | | | | |
| pf | — | — | 4.0 | — | 2.0 | — | — | 3.0 |
| df | — | — | — | 9.6 | — | 5.0 | 3.0 | — |

These dimensions result in a angle α of approximately 60°.

TABLE B

Planar Loop Circumferences (inches)

| Appendage | Appendage 31 | | Appendage 32 | | Appendage 41 | | Appendage 42 | |
|---|---|---|---|---|---|---|---|---|
| | pm | dm | pf | dm | pm | df | pf | df |
| 31 | | | | | | | | |
| pm | — | — | 2.0 | — | — | 6.8 | 4.5 | 7.5 |
| dm | — | — | 4.3 | — | — | 9.2 | 7.5 | 10.5 |
| 32 | | | | | | | | |
| pf | 2.0 | 4.3 | — | 3.0 | 4.5 | — | — | — |
| dm | — | — | 3.0 | — | — | 10.5 | 6.8 | 9.2 |
| 41 | | | | | | | | |
| pm | — | — | 4.5 | — | — | 3.0 | 2.0 | 4.3 |
| df | 6.8 | 9.2 | — | 10.5 | 3.0 | — | — | — |
| 42 | | | | | | | | |
| pf | 4.5 | 7.5 | — | 6.8 | 2.0 | — | — | — |
| df | 7.5 | 10.5 | — | 9.2 | 4.3 | — | — | — |

Accordingly, a single convenient connector which is about 10 inches long and about 5 inches wide equipped with 4 sets of snaps can produce loops with planar circumferences of 2, 3, 4.3, 4.5, 6.8, 7.5, 9.2 and 10.5 inches.

The specification is presented to aid in a complete non-limiting understanding of the invention. Since many variations and embodiments of the invention can be made without departing from the spirit and scope of the invention, the invention resides in the claims hereafter appended.

I claim:

1. A connector, comprising:
   (a) a longitudinal length of material having first and second longitudinal ends,
   (b) a first pair of laterally extending extending from the first longitudinal end of the longitudinal length of material as mirror-images of one another wherein (—) a first of the appendages includes a pair of male snap halves spaced along the length of the first appendage, and (—) a second of the appendages includes a male snap half and a female snap half spaced along the length of the second appendage,
   (c) a second pair of laterally extending appendages extending from the second longitudinal end of the longitudinal length of material as mirror-images of one another wherein (—) a first of the appendages includes a pair of female snap halves spaced along the length of the first appendage, and (—) a second of the appendages includes a male snap half and a female snap half spaced along the length of the second appendage,
   wherein the first appendage of the first pair and the first appendage of the second pair extend in substantially diametrically opposed directions and the second appendage of the first pair and the second appendage of the second pair extend in substantially diametrically opposed directions.

2. The connector of claim 1 wherein the longitudinal length of material and the appendages are a continuous body of elastic material.

3. The connector of claim 1 wherein (—) the appendages each have a proximal end closest to the longitudinal length of material and a distal end furthest from the longitudinal length of material, and (—) the combination male and female snap halves spaced along the length of the second appendages are arranged to provide one of the second appendages with a male snap half proximate the distal end of the appendage and the other of the second appendages with a female snap half proximate the distal end of the appendage so as to permit coupling together of the distal ends of the second appendages.

4. The connector of claim 1 wherein (—) the second appendage of the first pair includes a female snap half proximate the proximal end of the appendage and a male snap half proximate the distal end of the appendage, and (—) the second appendage of the second pair includes a male snap half proximate the proximal end of the appendage and a female snap half proximate the distal end of the appendage.

5. The connector of claim 1 wherein the appendages extend laterally at an angle of about 20° to 90° with respect to each other.

6. The connector of claim 1 wherein the connector is about 6 to 12 inches in length and about 3 to 6 inches in width.

7. The connector of claim 1 wherein the longitudinal length of material is about 2 to about 6 inches in length and the appendages are independently about 3 to 6 inches in length.

* * * * *